(12) United States Patent
Jang

(10) Patent No.: US 9,302,357 B2
(45) Date of Patent: Apr. 5, 2016

(54) PANEL JIG DEVICE FOR VEHICLE

(71) Applicant: Hyundai Motor Company, Seoul (KR)

(72) Inventor: Yoon Jang, Whasung-Si (KR)

(73) Assignee: Hyundai Motor Company, Seoul (KR)

(*) Notice: Subject to any disclaimer, the term of this patent is extended or adjusted under 35 U.S.C. 154(b) by 155 days.

(21) Appl. No.: 14/093,991

(22) Filed: Dec. 2, 2013

(65) Prior Publication Data
US 2014/0333019 A1 Nov. 13, 2014

(30) Foreign Application Priority Data

May 7, 2013 (KR) .................. 10-2013-0051379

(51) Int. Cl.
B23Q 3/18 (2006.01)
B23Q 1/26 (2006.01)
B23P 19/04 (2006.01)
B25B 5/00 (2006.01)

(52) U.S. Cl.
CPC . B23Q 1/26 (2013.01); B23P 19/04 (2013.01); B25B 5/006 (2013.01)

(58) Field of Classification Search
CPC .................. B23P 19/04; B23Q 1/26
USPC .......... 269/32, 24, 27, 228, 143, 249
See application file for complete search history.

(56) References Cited

U.S. PATENT DOCUMENTS 6,439,560 B2 * 8/2002 Sawada et al. .................. 269/32

FOREIGN PATENT DOCUMENTS

KR 10-2011-0065865 A 6/2011

* cited by examiner

Primary Examiner — Monica Carter
Assistant Examiner — Nirvana Deonauth
(74) Attorney, Agent, or Firm — Morgan, Lewis & Bockius LLP

(57) ABSTRACT

A panel jig device for a vehicle may include: a base bracket disposed on a jig base; a motor assembly mounted on the base bracket and including a rotary shaft; a locator having a locator end supporting a holding portion of a panel, connected to the rotary shaft of the motor assembly, and rotating about the rotary shaft with rotation of the rotary shaft; a clamping cylinder including an operating rod selectively operating forward/backward, and hinged to the locator; and a damper having one end hinged to the operating rod, a center portion hinged to the locator, and the other end with a clamping end supporting the holding portion of the panel.

15 Claims, 6 Drawing Sheets

PANEL JIG DEVICE FOR VEHICLE

CROSS-REFERENCE TO RELATED APPLICATION

The present application claims priority of Korean Patent Application Number 10-2013-0051379 filed on May 7, 2013, the entire contents of which application are incorporated herein for all purposes by this reference.

BACKGROUND OF INVENTION

1. Field of Invention

The present invention relates to a panel jig device for a vehicle. More particularly, the present invention relates to a panel jig device for a vehicle which can adjust a clamping angle in correspondence to a panel restriction surface (a holding portion of a panel) which varies depending on the models, types or kinds of vehicles.

2. Description of Related Art

In general, vehicle bodies are formed in a body in white through a process of assembling various product panels produced through sub-processes for the vehicle bodies. The vehicle bodies as described can be assembled through the processes of mounting various panel parts such as a floor panel, side panels, a roof panel, a trunk lead panel tailgate panel, a hood panel, and fender panels. The panels are manufactured by pressing and can be mounted on a vehicle body after processes such as assembling, welding, soldering, and hemming while restricted (held or clamped) in a panel jig device in a vehicle body assembly process.

The panel jig device, which fixes or arranges a panel, can be classified into key, loading, re-spot, and hinge assembly jigs in accordance with the function. The jigs are important equipment that determines the assembly quality of vehicles and may be used to hold or clamp, for example, a trunk lad and a tail gate.

However, common panel jig devices have problems in that they can be difficult to use for trunk leads and tail gates having various shapes and sizes for the kinds of vehicles. Accordingly, exclusive jig devices are used for the kinds of vehicles and the items. When different exclusive jig devices are used for the kinds of vehicles and the items, as described above, additional cost for reconstructing the jig devices or manufacturing a new jig device is required for a new kind of vehicle, such that the entire investment cost may be increased.

On the other hand, panel jig devices include various clamp units for restricting (holding, keeping in position, or clamping) a panel. The clamp units may be exclusive units of which the locator surface and the clamping angle (clamping operation angle) are adjusted in accordance with the restriction surface of panels, but it is disadvantageous for various kinds of vehicles because the shape of the panel restriction surfaces are various for the kinds of vehicles.

Recently, a swivel clamp unit is used as another example of clamp units. As the swivel clamp unit, a swivel joint that can restrict the restriction surface of a panel is used, so it is possible to adjust the clamping angle (clamping operation angle) in accordance with the shape of various panel restriction surfaces for the kinds of vehicles.

However, the swivel clamp unit can adjust the swivel angle of the clamping angle only within about ±15, such that it has a limitation in use for the panels of various kinds of vehicles. Further, when there is a difference between the clamping angle and the angle of the panel restriction surface (holding portion of a panel), the panel restriction surface (holding surface of a panel) may be damaged by the clamping angle in clamping.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a panel jig device for a vehicle having advantages of being able to adjust an angle to fit to the shape of a panel restriction surface so that it can restrict (e.g., clamp) various panels for various models, types, or kinds of vehicles.

Various aspects of the present invention provide a panel jig device for a vehicle, which includes: a base bracket disposed on a jig base; a motor assembly mounted on the base bracket and including a rotary shaft; a locator having a locator end supporting a holding portion of a panel, connected to the rotary shaft of the motor assembly, and rotating about the rotary shaft with rotation of the rotary shaft; a clamping cylinder including an operating rod selectively operating forward/backward, and hinged to the locator; and a clamper having one end hinged to the operating rod, a center portion hinged to the locator, and the other end with a clamping end supporting the holding portion of the panel.

The locator may be rotated by operation of the motor assembly, corresponding to a cross-sectional angle of the panel holding portion. The motor assembly may include an electric motor fixed to the base bracket, and a gear box connected with the electric motor and transmitting rotation of the electric motor to the rotary shaft. A connecting pin coupled with the rotary shaft may be disposed in the locator.

The panel jig device may further include a guide unit connected to the base bracket and the locator and arranging the panel by sliding with rotation of the locator. The guide unit may include a guide plate slidably coupled with the locator and the base bracket, and a guide bar coupled with the guide plate and arranging the panel.

A first guide pin may be formed at the locator, a first slot in which the first guide pin is inserted may be formed at the guide plate, a second guide pin may be formed at the guide plate, and a second slot in which the second guide pin is inserted to guide the guide plate may be formed a the base bracket. The first slot may be substantially diagonally formed at the upper portion of the guide plate, and the second slot may be formed in the horizontal direction of the base bracket.

Various other aspects of the present invention provide a panel jig device for a vehicle, which may include: a base bracket disposed on a jig base; a motor assembly mounted on the base bracket and including a rotary shaft; a locator having a locator end supporting a holding portion of a panel, connected to the rotary shaft of the motor assembly, and rotating about the rotary shaft with rotation of the rotary shaft; a clamping cylinder including an operating rod selectively operating forward/backward, and hinged to the locator; a clamper having one end hinged to the operating rod, a center portion hinged to the locator, and the other end with a clamping end supporting the holding portion of the panel; and a guide unit connected to the base bracket and the locator and arranging the panel by moving in the horizontal direction of the base bracket with rotation of the locator.

The motor assembly may include an electric motor fixed to the base bracket, and a gear box connected with the electric motor and transmitting rotation of the electric motor to the rotary shaft, and the locator may rotate to correspond to a cross-sectional angle of the panel holding portion in accordance with selective operation of the electric motor.

The guide unit may include a guide plate slidably coupled with the locator and the base bracket and a guide bar coupled with the guide plate and arranging the panel, a first guide pin may be formed at the locator, a first slot in which the first guide pin is inserted may be formed at the guide plate, a second guide pin may be formed at the guide plate, and a second slot in which the second guide pin is inserted to guide the guide plate may be formed at the base bracket. The first slot may be substantially diagonally formed at the upper portion of the guide plate, and the second slot may be formed in the horizontal direction of the base bracket.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
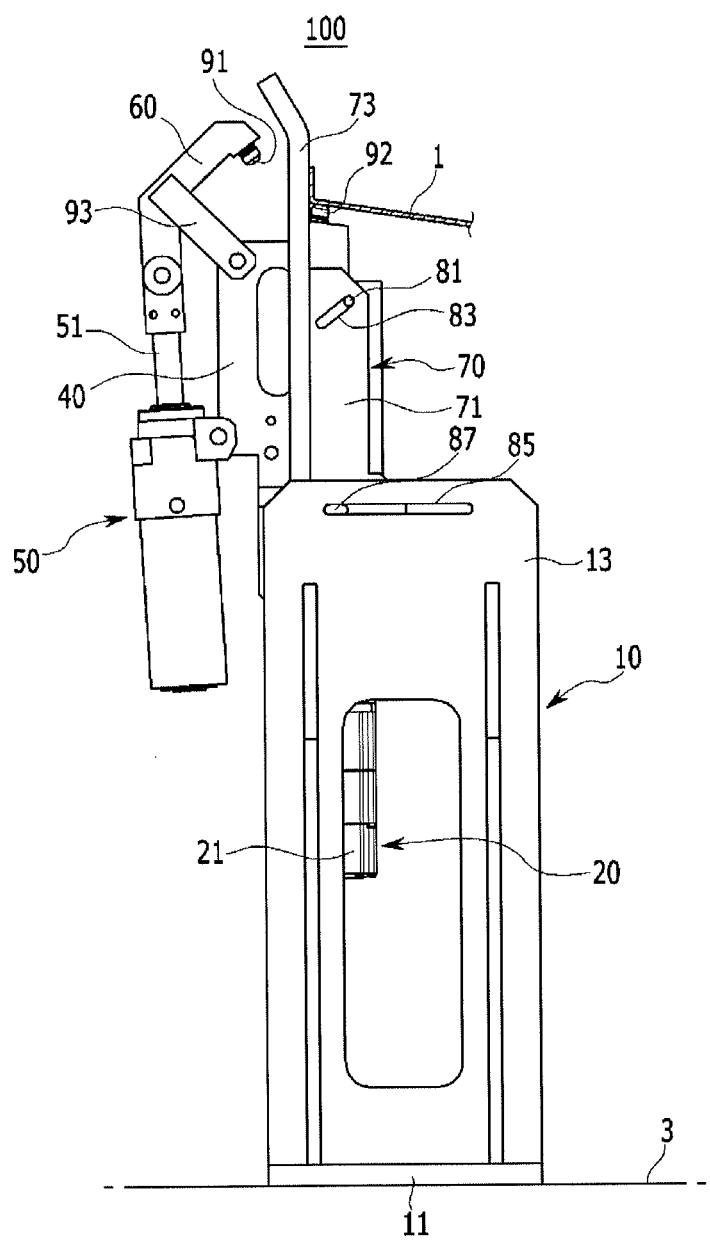
FIG. 1 is a front view showing an exemplary panel jig device for a vehicle according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The unrelated parts to the description of the exemplary embodiments are not shown to make the description clear and like reference numerals designate like element throughout the specification. Further, the sizes and thicknesses of the configurations shown in the drawings are provided selectively for the convenience of description, so that the present invention is not limited to those shown in the drawings and the thicknesses are exaggerated to make some parts and regions clear.

Discriminating the names of components with the first, the second, etc. in the following description is for discriminating them for the same relationship of the components and the components are not limited to the order in the following description. Throughout the specification, unless explicitly described to the contrary, the word "comprise" and variations such as "comprises" or "comprising", will be understood to imply the inclusion of stated elements but not the exclusion of any other elements. Further, the terms, " . . . unit", " . . . mechanism", " . . . portion", " . . . member" etc. used herein mean the unit of inclusive components performing at least one or more functions or operations.

Figure 2:
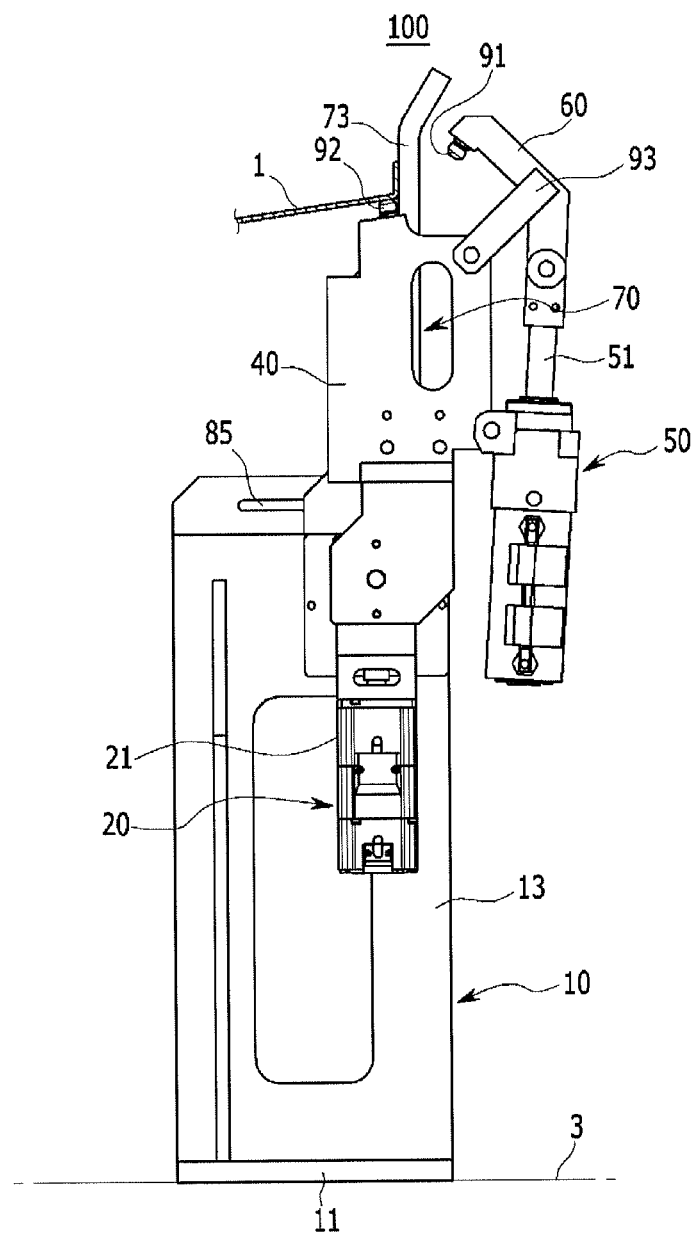
FIG. 2 is a rear view showing an exemplary panel jig device for a vehicle according to the present invention.

FIG. 1 is a front view showing a panel jig device for a vehicle and FIG. 2 is a rear view showing the panel jig device for a vehicle according to various embodiments of the present invention. Referring to FIGS. 1 and 2, a panel jig device 100 for a vehicle can be used for a vehicle body assembly process of assembling various vehicle body panels, which are manufactured and carried from a vehicle body sub-assembly line, to a vehicle body.

The panel jig device 100 for a vehicle according to various embodiments of the present invention which is described below is for restricting, for example, keeping in position, arranging, and clamping a panel 1, may be installed on a jig base 3. The jig base 3, which is a jig frame supporting the clamp device, includes accessories such as various brackets and support blocks for supporting the clamp device. The accessories are referred to as the jig base 3 or considered to be a part of the jig base 3 in many cases, except for some exceptional cases.

The panel jig device 100 for a vehicle according to various embodiments of the present invention has a structure that can clamp a panel 1 that is different for various models, types or kinds of vehicles and can adjust the clamping angle (clamping operation angle) to fit to the shape (angle) of a panel holding portion without damaging the panel 1.

Figure 3:
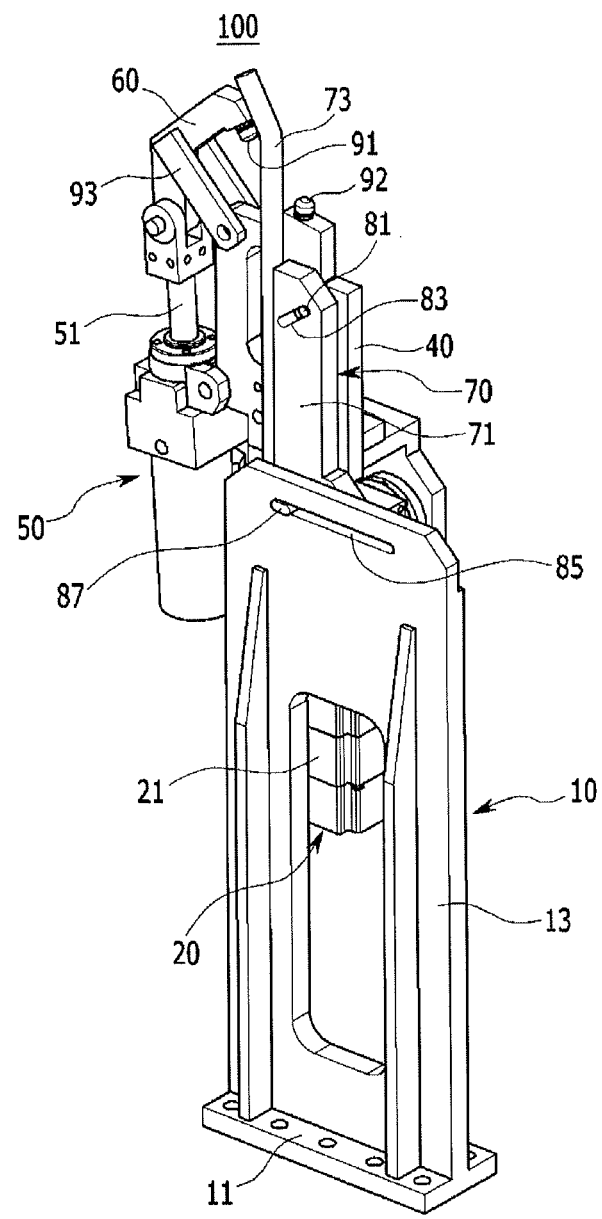
FIGS. 3 and 4 are perspective views showing an exemplary panel jig device for a vehicle according to the present invention.
Figure 4:
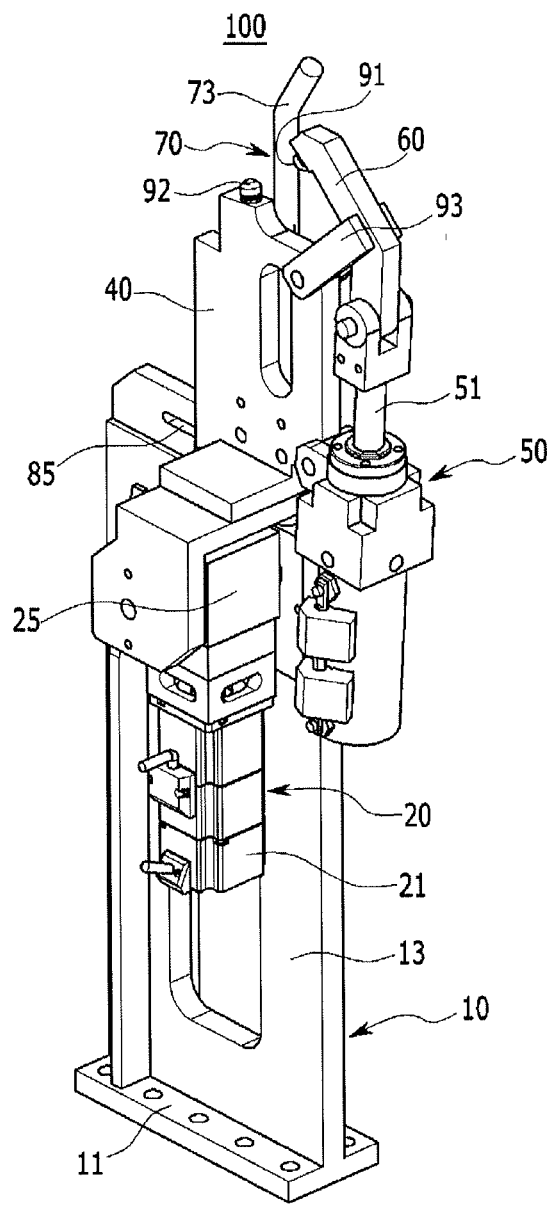
Figure 5:
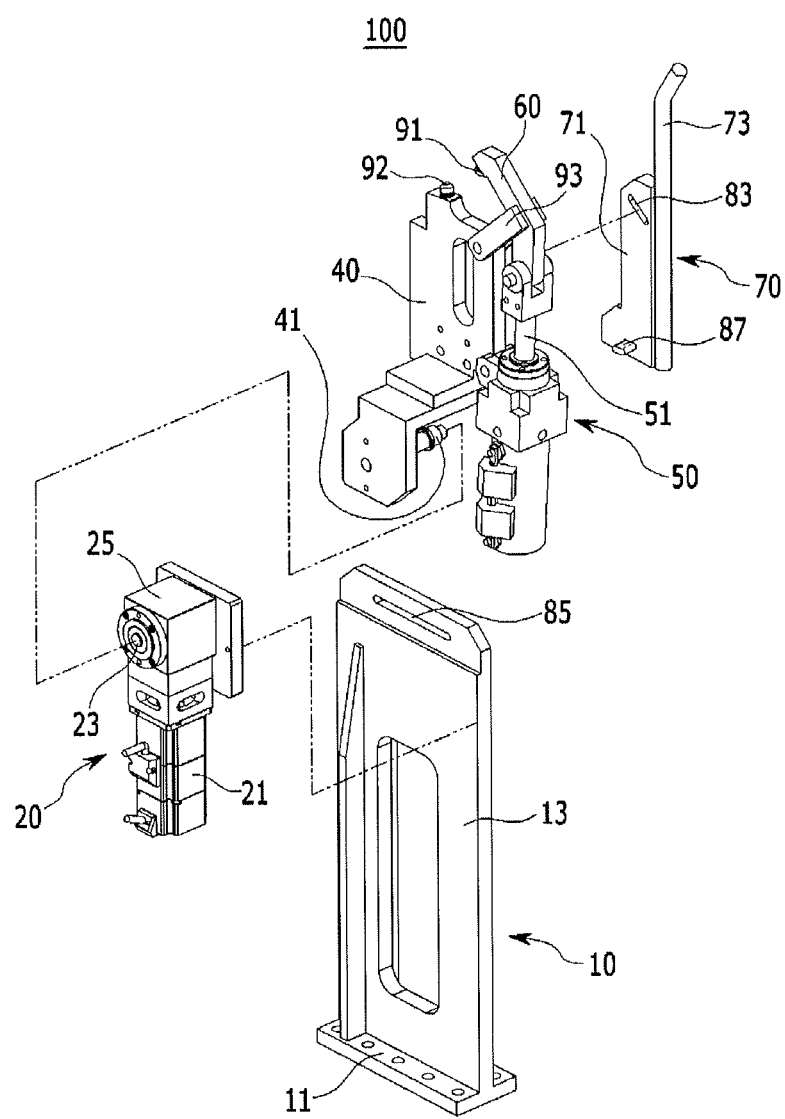
FIG. 5 is an exploded perspective view showing an exemplary panel jig device for a vehicle according to the present invention.

FIGS. 3 and 4 are perspective views showing the panel jig device for a vehicle and FIG. 5 is an exploded perspective view showing the panel jig device for a vehicle according to various embodiments of the present invention. Referring to FIGS. 3 to 5, the panel jig device 100 for a vehicle includes a base bracket 10, a motor assembly 20, a locator 40, a clamping cylinder 50, a clamper 60, and a guide unit 70.

The base bracket 10 is fixed on the jig base 3. The base bracket 10 includes a base plate 11 fixed on the jig base 3 and a fixing plate 13 vertically disposed on the base plate 11. The motor assembly 20 is mounted on the base bracket 10 and includes an electric motor 21 fixed to the fixing plate 13 of the base bracket 10 and a gear box 25 connected with the electric motor 21 and a rotary shaft 23.

The electric motor 21 and the gear box 25 are connected through a driving shaft and the gear box 25 outputs the torque through the rotary shaft 23 while reducing the rotation speed of the electric motor 21. The rotary shaft 23 of the gear box 25 is connected with the locator 40, which is further described below. The configuration of the electric motor 21 and the gear box 25 may be achieved by the motor assembly known in the art, so it is not described in detail herein.

The locator 40, which arranges the panel 1, is combined or coupled with the rotary shaft 23 of the motor assembly 20. A connecting pin 41 combined or coupled with the rotary shaft 23 of the motor assembly 20 is disposed in the locator 40. The locator 40 can be rotated at a predetermined angle by the electric motor 21, by the connecting pin 41 combined or coupled with the rotary shaft 23 of the motor assembly 20. In this case, the locator 40 can be rotated by the motor assembly 20, for example, within 0 to 30 degrees in accordance with the cross-sectional angle of the panel holding portion.

The clamping cylinder 50, which is an actuator providing a clamping force for restricting a restriction portion (holding portion) of the panel 1, includes an operating rod 51, is hinged to the locator 40, and can rotate with the locator 40.

The clamper 60, which actually clamps the restriction portion (holding portion) of the panel 1 supported by the locator 40, has one end hinged to the operating rod 51 of the clamping cylinder 50 and the center portion connected to the top of the locator 40 through a hinge rod 93. Since one end of the clamper 60 is hinged to the operating rod 51 and the center portion is hinged to the locator 40, the other end can clamp the restriction portion (holding portion) of the panel 1 by forward movement of the operating rod 51 of the clamping cylinder 50. The clamper 60 has a clamping end 91 that clamps the panel 1 is at the other end and the locator 40 has a locator end 92 that clamps the panel 1 together with the clamping end 91.

In various embodiments of the present invention, the guide unit 70, which arranges the panel 1 while the panel 1 is clamped, can move and arrange the panel 1, when the locator 40 is rotated by the motor assembly 20. The guide unit 70 is connected to the base bracket 10 and the locator 40 and includes a guide plate 71 and a guide bar 73. The guide plate 71 can be connected slidably to the locator 40 and the base bracket 10. The guide bar 73, which actually arranges the panel 1, is combined or coupled with the guide plate 71 and may be vertically disposed on the fixing plate 13 of the base bracket 10.

Various embodiments of the present invention also include a mechanism that converts the rotational motion of the locator 40 into a straight or translational motion of the guide unit 70 to slide the guide unit 70, when the locator 40 is rotated by the motor assembly 20. The mechanism that converts the rotational motion of the locator 40 in the straight or translational motion of the guide unit 70 is described hereafter.

The locator 40 has a first guide pin 81. A first slot 83 for converting the rotational motion of the locator 40 in to a straight or translational motion is formed in the guide plate 71, corresponding to the first guide pin 81. The first guide pin 81 of the locator 40 can be inserted into the first slot 83. The first slot 83 may be formed diagonally or substantially diagonally at the upper portion of the guide plate 71.

A second guide pin 87 is disposed at the lower portion of the guide plate 71 and a second slot 85 that horizontally guides the guide plate 71 may be formed at the base bracket 10. The second slot 85 may horizontally extend at the upper portion of the fixing plate 13 of the base bracket 10. The second guide pin 87 is inserted in the second slot 85, and as the locator 40 rotates, the first guide pin 81 of the locator 40 moves along the first slot 83 and the second guide pin 87 moves along the second slot 85.

The operation of the panel jig device 100 for a vehicle according to various embodiments of the present invention which has the configuration described above or similar configurations is described hereafter in detail with reference to the drawings stated herein.

Figure 6:
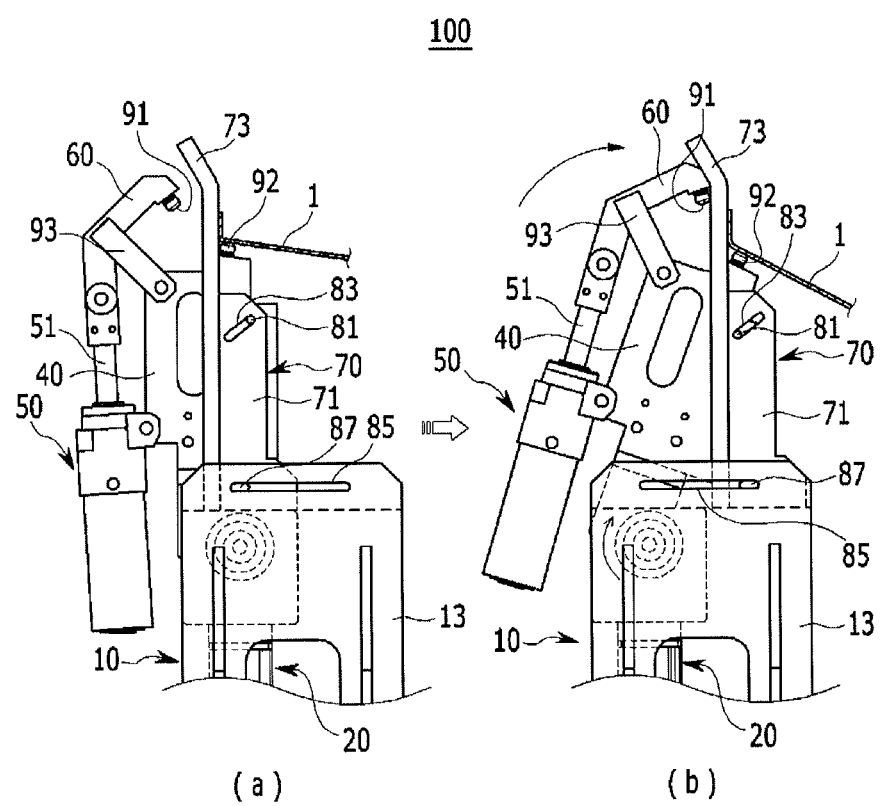
FIG. 6 is a view illustrating the operation of an exemplary panel jig device for a vehicle according to the present invention.

FIG. 6 is a view illustrating the operation of the panel jig device for a vehicle according to various embodiments of the present invention. Referring to (a) of FIG. 6, first, when the device is used for the panel 1 of a vehicle without a change in angle of the panel holding portion, the locator 40 is vertically or substantially vertically positioned on the base bracket 10 without rotating and supports the restriction portion (holding portion) of the panel 1. As the operating rod 51 of the clamping cylinder 50 is moved forward, the clamping end 91 of the clamper 60 and the locator end 92 of the locator 40 clamp the restriction portion (holding portion) of the panel 1.

On the other hand, when there is a difference in the cross-sectional angle of the panel holding portion due to change of the vehicle, the motor assembly 20 operates and the locator 40 is rotated by the difference in angle of the cross-section, as in (b) of FIG. 6. The operation of the motor assembly 20 and the rotational angle of the locator 40 depend on the kind of the vehicle put in the work operation, which are performed by control of a controller according to an operation map inputted in advance. The operation of the motor assembly and the control of the controller are known to those skilled in the art, so they are not described in detail.

The clamping cylinder 50 also rotates with the locator 40 and the damper 60 is rotated by the forward movement of the operating rod 51 of the clamping cylinder 50, such that they clamp the panel holding portion, with the clamping surface (clamping operation angle) and the panel holding portion being in parallel with each other. While the locator 40 is rotated at a predetermined angle by the motor assembly 20, in various embodiments of the present invention, the guide unit 70 moves straight horizontally along the base bracket 10 and the panel 1 is arranged by the guide bar 73.

For the straight or translational movement of the guide unit 70 as the locator 40 rotates, the torque of the locator 40 is provided to the guide plate 71 of the guide unit 70 through the first guide pin 81. The first guide pin 81 is inserted in the first slot 83 diagonally or substantially diagonally formed at the upper portion of the guide plate 71 and the second guide pin 87 is inserted in the second slot 85 of the base bracket 10, such that the guide plate 71 is moved straight horizontally by the torque of the locator 40.

As described above, according to the panel jig device 100 for a vehicle of the present invention, it is possible to variously adjust the clamping angle for restricting the panel holding portion while rotating the locator 40 in accordance with the shape (angle) of the panel holding portion. Further, it is possible to arrange the panel 1 by moving straight the guide unit 70 simultaneously with the locator 40 when the clamping angle rotates in correspondence to the restriction portion (holding portion) of the panel 1 which is different for the kinds of vehicles.

Accordingly, in various embodiments of the present invention, it is possible to arrange the panel 1 while rotating the clamping angle in correspondence to the restriction portion (holding portion) of the panel 1 which is different for the kinds of vehicle and moving the guide unit 70 straight simultaneously with clamping the restriction portion (holding portion) of the panel 1 with the restriction portion (holding portion) of the panel 1 and the clamping angle being in parallel. Therefore, it is possible to restrict the panel 1 of various kinds of vehicles which is different for the kinds of vehicles and to improve flexible productivity by using the device in common production equipment for various kinds of vehicles.

Furthermore, in various embodiments of the present invention, unlike the swivel clamp units of the related art which have a limitation in absorbing the cross-sectional angle of a panel holding portion, it is possible to significantly increase the allowable clamping angle for a panel holding portion by rotating the locator 40 and the clamping cylinder 50, using the motor assembly 20. Accordingly, since the restriction portion (holding portion) of the panel 1 is clamped, with the restriction portion (holding portion) of the panel 1 and the clamping angle being in parallel with each other, in correspondence to the restriction portion (holding portion) of the panel 1 which is different for the kinds of vehicles, it is possible to prevent damage to the panel 1, unlike the swivel clamp units of the related art.

For convenience in explanation and accurate definition in the appended claims, the terms "upper" or "lower", "horizontally" or "vertically", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A panel jig device for a vehicle, comprising:
a base bracket disposed on a jig base;
a motor assembly mounted on the base bracket and including a rotary shaft;
a locator having a locator end supporting a holding portion of a panel, connected to the rotary shaft of the motor assembly, and rotating about the rotary shaft with rotation of the rotary shaft;
a clamping cylinder including an operating rod selectively operating forward and backward, and hinged to the locator; and
a clamper having one end hinged to the operating rod, a center portion hinged to the locator, and the other end with a clamping end supporting the holding portion of the panel,
wherein the motor assembly includes:
an electric motor fixed to the base bracket; and
a gear box connected with the electric motor and transmitting rotation of the electric motor to the rotary shaft.

2. The panel jig device of claim 1, wherein the locator is rotated by operation of the motor assembly, corresponding to a cross-sectional angle of the panel holding portion.

3. The panel jig device of claim 1, wherein a connecting pin coupled with the rotary shaft is disposed in the locator.

4. The panel jig device of claim 1, further comprising a guide unit connected to the base bracket and the locator and arranging the panel by sliding with rotation of the locator.

5. The panel jig device of claim 4, wherein the guide unit includes:
a guide plate relatively slidably coupled with the locator and the base bracket; and
a guide bar coupled with the guide plate and arranging the panel.

6. The panel jig device of claim 5, wherein:
a first guide pin is formed at the locator,
a first slot in which the first guide pin is inserted is formed at the guide plate,
a second guide pin is formed at the guide plate, and
a second slot in which the second guide pin is inserted to guide the guide plate is formed at the base bracket.

7. The panel jig device of claim 6, wherein the first slot is substantially diagonally formed at an upper portion of the guide plate, and the second slot is formed in an a horizontal direction of the base bracket.

8. A panel jig device for a vehicle, comprising:
a base bracket disposed on a jig base;
a motor assembly mounted on the base bracket and including a rotary shaft;
a locator having a locator end supporting a holding portion of a panel, connected to the rotary shaft of the motor assembly, and rotating about the rotary shaft with rotation of the rotary shaft;
a clamping cylinder including an operating rod selectively operating forward and backward, and hinged to the locator;
a clamper having one end hinged to the operating rod, a center portion hinged to the locator, and the other end with a clamping end supporting the holding portion of the panel; and
a guide unit connected to the base bracket and the locator and arranging the panel by moving in a horizontal direction of the base bracket with rotation of the locator,
wherein the motor assembly includes an electric motor fixed to the base bracket, and a gear box connected with the electric motor and transmitting rotation of the electric motor to the rotary shaft, and the locator rotates to correspond to a cross-sectional angle of the panel holding portion in accordance with selective operation of the electric motor.

9. The panel jig device of claim 8, wherein:
the guide unit includes a guide plate slidably coupled with the locator and the base bracket, and a guide bar coupled with the guide plate and arranging the panel,
a first guide pin is formed at the locator,
a first slot in which the first guide pin is inserted is formed at the guide plate,
a second guide pin is formed at the guide plate, and
a second slot in which the second guide pin is inserted to guide the guide plate is formed at the base bracket.

10. The panel jig device of claim 9, wherein the first slot is substantially diagonally formed at the upper portion of the guide plate, and the second slot is formed in the horizontal direction of the base bracket.

11. A panel jig device for a vehicle, comprising:
a base bracket disposed on a jig base;
a motor assembly mounted on the base bracket and including a rotary shaft;
a locator having a locator end supporting a holding portion of a panel, connected to the rotary shaft of the motor assembly, and rotating about the rotary shaft with rotation of the rotary shaft;
a clamping cylinder including an operating rod selectively operating forward and backward, and hinged to the locator; and
a clamper having one end hinged to the operating rod, a center portion hinged to the locator, and the other end with a clamping end supporting the holding portion of the panel,
wherein a connecting pin coupled with the rotary shaft is disposed in the locator.

12. The panel jig device of claim 11, further comprising a guide unit connected to the base bracket and the locator and arranging the panel by sliding with rotation of the locator.

13. The panel jig device of claim 12, wherein the guide unit includes:
a guide plate relatively slidably coupled with the locator and the base bracket; and
a guide bar coupled with the guide plate and arranging the panel.

14. The panel jig device of claim 13, wherein:
a first guide pin is formed at the locator,
a first slot in which the first guide pin is inserted is formed at the guide plate,
a second guide pin is formed at the guide plate, and
a second slot in which the second guide pin is inserted to guide the guide plate is formed at the base bracket.

15. The panel jig device of claim 14, wherein the first slot is substantially diagonally formed at an upper portion of the guide plate, and the second slot is formed in a horizontal direction of the base bracket.

\* \* \* \* \*